United States Patent [19]

Teter et al.

[11] 4,084,439
[45] Apr. 18, 1978

[54] PRESSURE TRANSDUCER WITH CAPACITOR PICK-UP MEANS

[75] Inventors: Robert D. Teter, Olathe; James W. Maddock, Merriam; Paul L. Rothers, Gardner, all of Kans.

[73] Assignee: King Radio Corporation, Olathe, Kans.

[21] Appl. No.: 756,075

[22] Filed: Jan. 3, 1977

Related U.S. Application Data

[63] Continuation of Ser. No. 618,395, Oct. 1, 1975, abandoned.

[51] Int. Cl.² .............................................. G01L 9/12
[52] U.S. Cl. .................................................... 73/718
[58] Field of Search ............... 73/398 C, 398 R, 32 R, 73/406

[56] References Cited

U.S. PATENT DOCUMENTS

| 3,021,711 | 2/1962 | Arvidson | 73/398 R |
|---|---|---|---|
| 3,327,533 | 6/1967 | Kooiman | 73/398 R |
| 3,774,451 | 11/1973 | Thomas | 73/398 C |
| 3,863,505 | 2/1975 | Moffatt | 73/398 R |

Primary Examiner—Donald O. Woodiel
Attorney, Agent, or Firm—Lowe, Kokjer, Kircher, Wharton & Bowman

[57] ABSTRACT

A pressure transducer includes an electromagnetic drive coil which vibrates a thin walled cylinder at a natural vibrational mode. A capacitor unit senses the vibrational frequency of the cylinder and gives an output signal corresponding to the pressure differential between a fluid contained within the cylinder and a vacuum reference that is maintained adjacent to the exterior surface of the cylinder. Electric heaters maintain a constant operating temperature of the transducer.

2 Claims, 4 Drawing Figures

PRESSURE TRANSDUCER WITH CAPACITOR PICK-UP MEANS

This is a continuation of application Ser. No. 618,395, filed Oct. 1, 1975 now abandoned.

BACKGROUND AND SUMMARY OF THE INVENTION

This invention relates generally to pressure measurement and more particularly to a method and apparatus which utilizes a capacitor pick-up for measuring the differential pressure across the wall of a vibrating membrane.

The requirements for sensing and measuring pressure have been met by various devices, including sealed bellows, strain gauges, and variable inductance or capacitance sensors. However, vibrating cylinder pressure transducers have been increasingly employed for many pressure measurement applications, primarily due to their high resolution in comparison to most other devices. This type of transducer is disclosed in Arvidson U.S. Pat. No. 3,021,711 which issued Feb. 20, 1962. As explained in the patent, a thin walled cylinder is placed in flexural mode vibration by an electromagnetic drive coil. Since the resonant frequency of the cylinder depends upon the pressure differential across its wall, an electromagnetic pick-up coil which senses the vibrational frequency of the cylinder provides an output signal that is indicative of the pressure differential between fluids acting against the opposite surfaces of the cylinder wall.

The primary difficulty with vibrating cylinder transducers has been the cross coupling or "cross talk" that occurs between the drive and pick-up coils. This cross talk is inherent in transducers which use electromagnetic coils for both drive and pick-up, and is highly undesirable because it raises the overall noise level, hampers the start of oscillation of the cylinder, and distorts the signal of the pick-up coil. Even though the coils are usually oriented at right angles with respect to one another in order to minimize the cross talk, it can never be completely eliminated because of the leakage flux that inevitably penetrates the loop of the pick-up coil, regardless of the coil orientation.

The above-mentioned perpendicular alignment of the coils necessarily limits the transducer to operation in even order flexural modes, e.g. the fourth, sixth, eighth, etc. Since the fourth order mode is one of the cleaner modes and has relatively good pressure resolution, transducers are usually operated therein (in the fourth order mode). The fifth order flexural mode has been found to be equally clean and also increases the pressure resolution approximately 37% over the resolution obtained in the fourth order. However, known prior art transducers employ two electromagnetic coils and are therefore not able to operate in the fifth order mode, despite its advantages in pressure resolution.

Another difficulty with existing transducers is that the vibrating cylinder does not act as a particularly good magnetic shield because of its thin wall construction. The outer protective cover of the transducer is inadvertently set into vibration as a result of the magnetic flux leakage through the cylinder wall. The vibration of the outer cover in turn affects the pick-up coil and causes significant perturbations in the output frequency, with resulting imprecision in the pressure measurement.

Temperature variations also affect the operation of vibrating cylinder transducers because the density and pressure of the fluids and the associated characteristics of the cylinder change along with the temperature. Accordingly, some existing units are provided with a temperature sensor and additional circuitry that is able to compensate for temperature changes. Even though temperature effects are thereby negated, the temperature sensors and circuitry are unsatisfactory from a practical standpoint because they are highly complex and expensive components which significantly increase the overall cost and maintenance requirements.

It is a principal object of the present invention to provide a unique method and apparatus for measuring pressure in a manner which eliminates the foregoing problems associated with pressure transducers employing electromagnetic coils for both drive and pick-up.

A more specific object of the invention is to provide an improved vibrating cylinder pressure transducer in which there is no cross coupling between the drive and pick-up mechanisms. It is an important feature of the invention that a capacitor pick-up unit is used. Accordingly, there is no loop area in the capacitor circuit which can be penetrated by the leakage flux from the drive coil.

A further object of the invention is to provide a pressure transducer that is able to operate in any desired flexural mode, including the relatively clean, high resolution fifth order mode. Unlike existing transducers which use electromagnetic pick-up, the subject invention employs a capacitor pick-up means which is not subject to any limitations as to its mode of operation.

Another object of the invention is to provide a pressure transducer in which the pick-up unit is isolated from the effects of vibration of the outer housing. Since the thin walled cylinder serves much better as an electrostatic shield than as an electromagnetic shield, magnetically induced vibration of the outer housing will not significantly affect the electric field of the capacitor.

An additional object of the invention is to provide a pressure transducer which includes heating means for maintaining the temperature of the transducer constant. Accordingly, undesirable temperature effects are eliminated without the necessity for complex circuitry such as that employed in existing units.

Yet another object of the invention is to provide a pressure transducer in which the drive coil operates highly efficiently with low energy requirements. The improved efficiency of the invention is achieved primarily by the use of a ferro-magnetic center support and the location of the drive coil at the center of the vibrating cylinder, which results in a higher Q than when the drive coil is above or below center with respect to the cylinder.

A still further object of the invention is to provide a pressure transducer of the character described which is durable, economical, reliable, and which achieves a high degree of pressure resolution.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are employed to indicate like parts in the various views.

Figure 1:
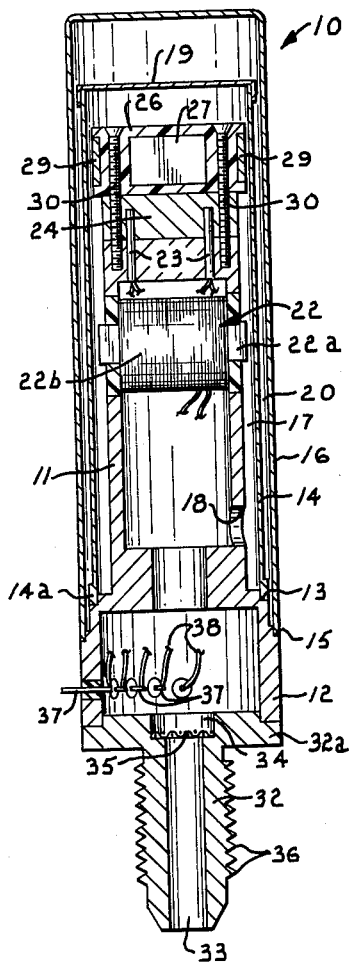
FIG. 1 is an elevational view taken in cross section through a pressure transducer constructed according to the present invention.

Referring now to the drawings in detail, a pressure transducer constructed according to the invention is generally designated by reference numeral 10 in FIG. 1. The pressure transducer includes a ferro-magnetic center support 11 which is of generally cylindrical shape with a hollow interior. The center support includes an enlarged base 12 which is integral therewith. The top surface of base 12 is recessed at its outer edge to form a small annular shoulder 13 on which a thin walled ferro-magnetic cylinder 14 is supported. The wall of base 12 is thickened somewhat at the lower portion of the base, with the top of the thickened portion being recessed at its outer edge to form an annular shoulder 15 on which the bottom edge of a cylindrical casing or outer housing 16 seats. Center support 11 and cylinder 14 are both preferably constructed of a ferro-magnetic alloy of iron, nickel, and chromium known as NI-SPAN-C902, which is a trademark of the Huntington Alloy Products Division of the International Nickel Company.

The lower end of cylinder 14 is provided with a circular ring or flange 14a which seats on shoulder 13. Prior to the assembly of the transducer, flange 14a is able to rotate on shoulder 13 while the thin walled cylinder is in vibration, and the optimum rotative position of cylinder 14 with respect to center support 11 can thus be determined. Flange 14a is electron beam welded to the center support base 12 to secure cylinder 14 in its optimum position. The cylinder is mounted outwardly from the cylindrical body of center support 11, and a space 17 is thereby presented between center support 11 and the internal surface of cylinder 14. An opening 18 is formed through the wall of center support 11 to provide an inlet to space 17 from the hollow interior of the center support. A cap or cover 19 is secured over the top of cylinder 14.

The cylindrical outer housing 16 is supported on shoulder 15 and is electron beam welded to base 12 of the center support. Housing 16 is spaced outwardly from cylinder 14 such that a closed space 20 is presented between the housing and the outer surface of the cylinder. Space 20 is preferably a gas tight area which provides a vacuum reference. The vacuum is easily obtained during the electron beam welding of housing 16 since the welding chamber is under vacuum and the seal resulting from the electron beam weld thereafter maintains the vacuum in space 20.

An electromagnetic drive coil 22 is mounted on center support 11 centrally within cylinder 14 and at a location halfway along the height of length of the cylinder. The ferrite core 22a of the drive coil is perpendicular to the longitudinal axis of cylinder 14 and has opposite ends or poles which project somewhat outwardly of center support 11. The core is wound with windings 22b in the usual manner.

The thick upper portion of center support 11 is provided with slots in its top in which heaters 23 are mounted. Heaters 23 are preferably electric heaters and may be of the type known as Posistor which is a trademark of Murata Manufacturing Company, Ltd. The heaters operate to maintain the operating temperature of the transducer constant so as to eliminate temperature fluctuations which would otherwise occur in cylinder 14 and the fluid contained therein. A thick plate 24 is placed on top of center support 11 and includes slots in which the top portions of heaters 23 are received.

The capacitor pick-up plates for the transducer are mounted on a cup member 26 which is located on top of plate 24. Cup member 26 may be plexiglass with the hollow interior of the cup member providing a protective housing in which a solid state amplifier 27 is mounted. The exterior side surface of cup member 26 is spaced slightly inwardly of cylinder 14 and is curved in conformity with the curvature of the cylinder. A plurality of curved recesses are formed in the surface of cup member 26 to closely receive and support capacitor plates 29 which are preferably copper plates. Plates 29 are firmly secured in the recesses, and each capacitor plate is curved to conform with the curvature of cylinder 14 so that its entire outer surface is spaced closely and uniformly from the interior surface of the cylinder. A conventional capacitor circuit (not shown) for the capacitor unit connects to each plate 29, and to amplifier 27. Elongate screws 30 extend through cup member 26 and plate 24, and the screws are threaded into the top of center support 11 to secure the cup member, plate 24, and amplifier 27 to the center support. It is noted that heaters 23 are located approximately two-thirds of the distance between drive coil 22 and capacitor plates 29.

In the embodiment shown in FIG. 1, the transducer is adapted to operate in the fourth order flexural mode, and four capacitor plates 29 are therefore provided. Each plate 29 extends one-eighth the circumference of cylinder 14 and the plates are spaced equidistantly around the circumference of cup member 26 at 90° intervals. In the alternative, the transducer may be constructed to operate in the more sensitive fifth order mode. In this case, the transducer will include five capacitor plates each of which will extend one-tenth the circumference of cylinder 14, and the plates will be spaced equidistantly from one another at 72° intervals around the circumference of cup member 26. Additionally, for operation in the fifth order mode, one pole of drive coil 22 will protrude outwardly to a greater extent than the other pole. It is to be further understood that the transducer may be made suitable for operation in even higher order modes by providing additional capacitor plates corresponding in number to the order in which the cylinder is to be vibrated.

A tube fitting 32 includes a circular flange 32a which is secured to the bottom end of the center support base 12 by electron beam welding. The tube portion of fitting 32 has a central bore 33 through which the fluid to be measured is introduced into the hollow interior of the center support. Bore 33 terminates in a counter bore 34 in which a stainless steel mesh filter 25 is mounted to filter the fluid. Fitting 32 is externally threaded as indicated at 36.

A plurality of terminals 37 are mounted to extend through the wall of base 12. Lead wires 38 connect to the respective terminals 37, and the wires extend within the hollow interior of center support 11 to connect with drive coil 22, heaters 23, and amplifier 27. In addition, the amplifier is connected to receive the output signal from the capacitor unit and to feed this signal back to drive coil 22. A second output of amplifier 27 feeds the signal from the capacitor unit to an electric frequency meter or the like (not shown).

The relationship between the vibrational frequency of cylinder 14 at resonance and the pressure differential across the thin cylinder wall is set forth in the Arvidson U.S. Pat. No. 3,021,711, and need not be restated herein. However, it is noted that the resonant frequency of the cylinder is dependent upon the pressure differential, and a measurement of the frequency will thus yield a measurement of the pressure differential. Constants which are included in the relationship depend upon the dimensions, shape, and material characteristics of the vibrating cylinder.

Figure 2:
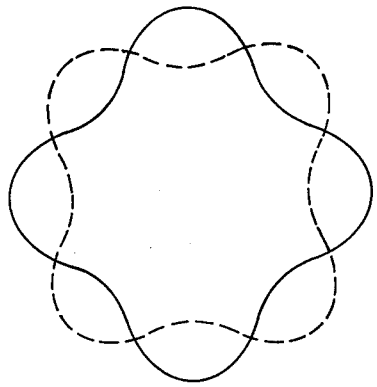
FIG. 2 is a schematic view illustrating the vibration of the cylinder in the fourth order flexural mode.

In operation of the transducer, the fluid to be measured is introduced through bore 33 and is filtered by the mesh filter 35 prior to entering space 17 through the hollow center support and inlet opening 18. Drive coil 22 is then energized by an alternating current in order to set cylinder 14 into vibration. In the illustrated embodiment wherein four capacitor plates 29 are included, the natural vibrational frequency of cylinder 14 in its fourth order flexural mode is determined, and a current of this frequency is supplied to coil 22. The feedback from the capacitor circuit through amplifier 27 to drive coil 22 provides a measurement of the natural frequency and maintains cylinder 14 in vibration in the fourth order mode, which is illustrated in FIG. 2.

The capacitor plates 29 form one set of plates of the capacitor while cylinder 14 provides the cooperating capacitor plate. The associated capacitor circuit senses the vibration of the cylinder and provides an oscillatory output signal that corresponds in frequency to the vibrational frequency of the cylinder. Since the natural frequency of the cylinder is dependent on the pressure differential between the vacuum space 20 and the fluid contained within space 17, the frequency of the output signal from the capacitor circuit corresponds to the absolute pressure of the fluid within space 17. The frequency meter (not shown) which receives the output signal from the capacitor circuit may be calibrated approximately to give a direct readout of the measured pressure.

As the transducer operates, heaters 23 maintain it at a constant temperature, and any thermal distortions resulting from temperature variations are therefore avoided. It is again pointed out that center support 11 is preferably a ferro-magnetic material because the efficiency of drive coil 22 is thereby increased and the amount of current necessary for the coil to sustain vibration of cylinder 14 is reduced. In addition, the drive coil is exactly centered with respect to the height or length of cylinder 14, and a higher Q value results than in transducers in which the drive coil is located above or below center.

Figure 3:
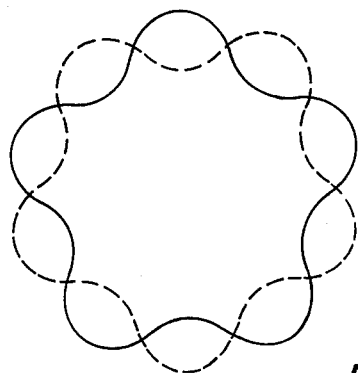
FIG. 3 is a schematic view illustrating the vibration of the cylinder in the fifth order flexural mode.
Figure 4:
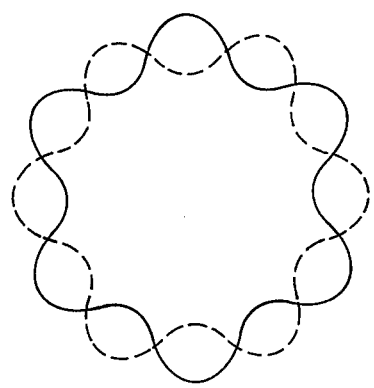
FIG. 4 is a schematic view illustrating the vibration of the cylinder in the sixth order flexural mode.

Although the operation of the pressure transducer has been described for the fourth order flexural mode, it is to be understood that operation in any desired mode is possible by providing the appropriate number of capacitor plates, as previously suggested. For example, five capacitor plates may be included in the pick-up unit to enable the transducer to operate in the clean, high resolution fifth order mode, which is illustrated in FIG. 3. In this case, the frequency of the current supplied to drive coil 22 will be equal to the natural frequency of the fifth order flexural mode. In a similar manner, the provision of six capacitor plates permit operation in the sixth order mode, as illustrated in FIG. 4, while additional capacitor plates may be provided to permit operation in still higher order modes. It is further contemplated that the difference between the unknown pressure of one fluid and the known pressure of another fluid can be measured by introducing one fluid into one of the spaces 17 or 20 and the other fluid into the other space. In this situation, space 20 will not be under vacuum, and appropriate inlet means will be provided for introducing fluid therein.

From the foregoing, it will be seen that this invention is one well adapted to attain all of the ends and objects herein set forth, together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described our invention, we claim:

1. A method of producing an electric signal indicative of the pressure differential between a fluid and a reference pressure, said method comprising the steps of:
   providing a vibrational membrane;
   maintaining said reference pressure on one side of said membrane;
   bringing said fluid into contact with the other side of said membrane;
   effecting vibration of said membrane in the fifth order vibrational mode thereof;
   locating five capacitor plates at spaced positions in proximity to said membrane to cooperate therewith in providing a capacitor to sense the vibrations of said membrane; and
   producing an oscillatory output signal from said capacitor corresponding in frequency to the vibrational frequency of said membrane, said output signal thereby being related to the pressure differential between said fluid and said reference pressure.

2. A pressure transducer for producing an electric signal indicative of the pressure differential between a fluid and a reference pressure, said pressure transducer comprising:
   a support member;
   a vibratory hollow member mounted on said support member and comprised of magnetic material, said hollow member having a first chamber defined therewithin;
   a casing enclosing said hollow member and spaced outwardly thereof to present a second chamber between said hollow member and casing, said first and second chambers being isolated from one another, one of said first and second chambers being maintained at said reference pressure and the other of said chambers having an inlet for receiving said fluid;
   an electric heater mounted on said support member within said hollow member, said heater being operable to emit heat;
   means for effecting vibration of said hollow member in a natural vibrational mode thereof; and
   capacitor means cooperating with said hollow member to sense the vibrations thereof, said capacitor means having an oscillatory electric output signal corresponding to the vibrational frequency of said hollow member and thus to the pressure differential between said fluid and said reference pressure.

* * * * *